(12) United States Patent
Pacary et al.

(10) Patent No.: US 8,474,573 B2
(45) Date of Patent: Jul. 2, 2013

(54) REINFORCED COMPOSITE SANDWICH PANEL

(75) Inventors: Jean-Luc Pacary, Meudon la Foret (FR); Paulo Francisco, Bezons (FR)

(73) Assignee: Societe Lorraine de Construction Aeronautique (FR)

( * ) Notice: Subject to any disclaimer, the term of this patent is extended or adjusted under 35 U.S.C. 154(b) by 0 days.

(21) Appl. No.: 13/120,717

(22) PCT Filed: Aug. 21, 2009

(86) PCT No.: PCT/FR2009/001020
§ 371 (c)(1),
(2), (4) Date: Mar. 24, 2011

(87) PCT Pub. No.: WO2010/034894
PCT Pub. Date: Apr. 1, 2010

(65) Prior Publication Data
US 2011/0174571 A1    Jul. 21, 2011

(30) Foreign Application Priority Data
Sep. 24, 2008 (FR) ...................................... 08 05242

(51) Int. Cl.
*E04B 1/82* (2006.01)
(52) U.S. Cl.
USPC ............. 181/290; 181/282; 181/284; 52/144; 52/145
(58) Field of Classification Search
USPC ....................... 181/292, 290, 284; 52/144, 145
See application file for complete search history.

(56) References Cited

U.S. PATENT DOCUMENTS

| 4,808,465 | A  | * | 2/1989  | Vane ............................. 442/371 |
| 6,220,388 | B1 | * | 4/2001  | Sanborn ......................... 181/290 |
| 6,296,076 | B1 | * | 10/2001 | Hiers et al. .................... 181/290 |
| 6,534,145 | B1 | * | 3/2003  | Boyles ........................... 428/92 |
| 6,743,504 | B1 | * | 6/2004  | Allen et al. .................... 428/362 |
| 8,079,443 | B2 | * | 12/2011 | Keller ........................... 181/292 |
| 2005/0025948 | A1 |  | 2/2005  | Johnson |
| 2008/0054231 | A1 | * | 3/2008  | Wenstrup et al. ............. 252/608 |
| 2008/0145592 | A1 | * | 6/2008  | Johnson .......................... 428/73 |

FOREIGN PATENT DOCUMENTS

| EP | 2008807 A2 | 12/2008 |
| WO | 0147706 A1 | 7/2001 |

OTHER PUBLICATIONS

International Search Report PCT/FR2009/001020; Dated Nov. 23, 2009.

* cited by examiner

*Primary Examiner* — Forrest M Phillips
(74) *Attorney, Agent, or Firm* — Cantor Colburn LLP

(57) ABSTRACT

The invention relates to a composite sandwich panel (1) comprising at least a web (2) provided between an inner skin (3) and an outer skin (4), each skin being made of a composite material from a plurality of fibrous plies (5, 6, 7, 8), characterized in that a portion of the plies of the inner skin and/or of the outer skin each extends at least partially through the web at an uninterrupted area thereof in order to form together a through-reinforcement (9) extending from the inner skin to the outer skin of the composite sandwich panel. The invention further relates to an aircraft element including such a composite sandwich panel.

12 Claims, 1 Drawing Sheet

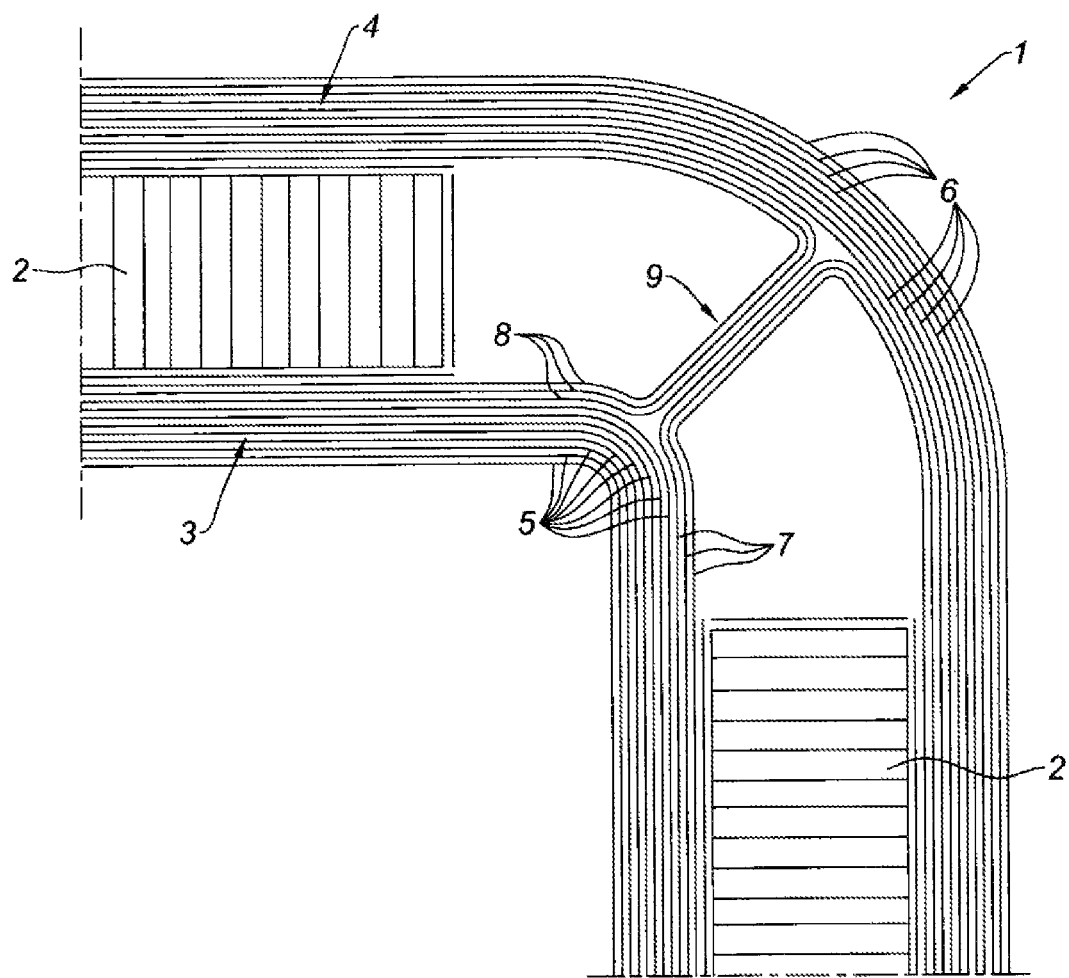

REINFORCED COMPOSITE SANDWICH PANEL

TECHNICAL FIELD

The present invention relates to a composite sandwich panel.

BACKGROUND

Composite sandwich panels are materials used with increasing frequency in various applications due to their excellent mechanical properties in light of their low mass.

A composite sandwich panel generally comprises a central layer forming a web that is gripped, sandwiched, between an inner skin and an outer skin made from a composite material, i.e. each made up of one or several fibrous plies pre-impregnated with resin that is then polymerized during a curing step.

Other methods use dry fibrous plies, i.e. not pre-impregnated with resin, the resin being applied later during a curing step during which it is forced by suction to spread between the fibrous plies.

Of course, a composite sandwich panel can also comprise several central layers, of the same type or different types, the central layers themselves being able to be separated by a layer of composite material.

The central layers can, for example, be of the cellular, balsa, or foam type, or can comprise one or several fusible inserts.

The composite sandwich panels use a honeycomb, balsa or foam, web, for example, helping reduce the mass of the objects while preserving or even increasing their mechanical properties.

The inner and/or outer skins can have particular finishes depending on the final application of the panel. An example of a finishing could be piercings through the inner skin in the case of an acoustic panel. Other examples in particular comprise conductive skins, sealing skins, etc . . .

One of the fields where the use of composite sandwich panels is particularly developed is in the aeronautics field.

Such panels are in particular used for floors, partitions, wing panels, etc.

Indeed, many panels, initially made from aluminum, were able to be replaced by composite sandwich panels, in particular comprising a web with a cellular structure of the Nomex, Kevlar or metal type, for example, much lighter and ensuring excellent mechanical properties, which allows significant lightening of airplanes and, as a result, causes decreased fuel consumption.

However, the curved zones in such panels are generally more fragile and must be reinforced, as these curved zones constitute stress concentration zones due to the bending of the piece. To do that, fittings or heavy reinforcements are used made from monolithic fabrics.

As a result, there is a need for a solution making it possible to effectively reinforce curved zones of a composite sandwich panel without excessively affecting the mass of said panel.

BRIEF SUMMARY

To that end, the present invention relates to a composite sandwich panel including at least one web comprised between an inner skin and an outer skin, each skin being made from a composite material from a plurality of fibrous plies, characterized in that part of the plies of the inner skin and/or the outer skin each extend at least partially through the web, at an interrupted zone of the latter, so as to form, together, at least one through-reinforcement extending from the inner skin to the outer skin of the composite sandwich panel.

Thus, by using part of the plies constituting the inner and/or outer skin to create a composite reinforcement incorporated into the panel, it is possible to locally reinforce the composite sandwich panel using a light reinforcement also having the excellent mechanical properties of a composite material. Moreover, the component plies of these reinforcements also belonging to the inner and/or outer skins, it follows that the forces exerted on said skins can be better reacted by the reinforcement.

It will also be noted that this reinforcement is attached or made directly with the panel and totally integrated therewith. It is therefore no longer necessary to attach a fastening element, such as a fitting or a monolithic fabric, which must be fixed in the panel and therefore risks making its structure fragile.

Advantageously, the through-reinforcement is made from at least one ply extending continuously from the outer skin to the inner skin. More precisely, a same ply can start from the inner skin (outer skin, respectively), extend through the sandwich panel to constitute the through-reinforcement, then continue to extend by forming a ply of the outer skin (inner skin, respectively). The same is true for the part of the panel situated on the other side of the reinforcement. Thus, a panel can even comprise several through-reinforcements formed from peripheral plies.

Preferably, the panel has a curved section.

Advantageously, the through-reinforcement is situated in the curved section.

Also advantageously, the through-reinforcement is made perpendicular to the curve of the panel.

Preferably, the through-reinforcement is made substantially in the middle of the curved section.

According to a first alternative embodiment of the composite sandwich panel, it comprises a cellular web.

Advantageously, the panel is an acoustic panel.

According to a second alternative embodiment of the composite sandwich panel, the web comprises a foam.

The present invention also relates to an element for an aircraft, characterized in that it comprises a composite sandwich panel according to the invention.

BRIEF DESCRIPTION OF THE DRAWING

The present invention will be better understood in light of the following detailed description, done in reference to the appended drawing in which the sole figure is a diagrammatic illustration in longitudinal cross-section of a composite sandwich panel according to the invention having a curved section.

DETAILED DESCRIPTION

A composite sandwich panel 1 according to the invention, as illustrated in FIG. 1, comprises a cellular web 2 comprised between an inner skin 3 and an outer skin 4, composite, each made from fibrous plies 5, 6, 7, 8 impregnated with polymerized resin.

The composite sandwich panel 1 has a curved section constituting a stress concentration zone and therefore forms a fragile zone of the part.

As a result, the through-reinforcement 9 is therefore provided forming a spoke of the curved section and oriented substantially perpendicular to the curve of the composite sandwich panel 1 in that zone.

According to the invention, the through-reinforcement 9 extending from the outer skin 4 to the inner skin 3 is made from part of the fibrous plies belonging to said inner 3 and outer 4 skins.

Of course, the cellular web 2 is interrupted in the curved section at said reinforcement 9 such that the latter extends through the sandwich panel 1.

More precisely, the outer skin 4 and the inner skin 3 comprise plies 5, 6 arranged towards the outside of the sandwich panel 1 and extending continuously along said panel from a straight section to a second straight section while following the curved section.

The outer skin 4 and the inner skin 3 also comprise plies 7, 8 arranged towards the inside of the sandwich panel 1 and extending along a straight section and over part of the curved section, where they form the through-reinforcement 9.

Thus, as shown in FIG. 1, the plies 7 extend continuously from the inner skin 3 along the straight section, passing through the sandwich panel 1 at the curved section while forming part of the plies of the reinforcement 9 and before extending at the outer skin 4 again along the straight section.

The same is true for the plies 8 for the other straight section.

Thus, at the curved section, the reinforcement 9 is formed by the plies 7 and the plies 8 coming from the straight sections.

The plies 7, 8 making up the reinforcement 9 are also impregnated with resin traditionally polymerized during a final manufacturing step.

It will be noted that the plies 7, 8 can continue to extend to form another reinforcement 9 in another curved section, and to thereby form peripheral plies.

Of course, the plies used can be of an identical or different nature depending on the desired properties.

Examples of the nature of plies traditionally used include glass fibers, carbon fibers, Kevlar fibers, etc . . .

Of course, the reinforcements can also be formed from plies with an identical or different nature depending on the desired properties.

In the case where the plies participating in the reinforcements do not have a sufficient resistance on their own or need to be reinforced, it is in particular possible to sew all or part of said plies together. It is also possible to insert reinforcing plies in the reinforcement, between the plies, such as carbon fiber plies, for example.

Although the invention has been described with one particular embodiment, it is obviously not limited thereto and encompasses all technical equivalents of the means described as well as combinations thereof if they are within the scope of the invention. It will in particular be noted that the reinforcement can be made during a preliminary step before application of the plies of outer and inner skin in a second step. It is in particular possible to use pre-impregnation techniques for fibrous plies or for infusing resin through said plies.

The invention claimed is:

1. A composite sandwich panel comprising:
   at least one web disposed between an inner skin and an outer skin, each skin being made from a composite material from a plurality of fibrous plies,
   wherein part of the structural plies constituting the inner skin and the outer skin each extend at least partially through the web, at an interrupted zone of the latter, so as to form, together, at least one through-reinforcement extending from the inner skin to the outer skin of the composite sandwich panel, and
   wherein the through-reinforcement comprises a plurality of first plies and a plurality of second plies, the plurality of first plies and the plurality of second plies each being independent from remaining plies among the plurality of fibrous plies, the remaining plies being excluded from the through-reinforcement.

2. The composite sandwich panel according to claim 1, wherein the through-reinforcement is made from at least one ply extending continuously from the outer skin to the inner skin.

3. The composite sandwich panel according to claim 1, wherein the panel has at least one curved section.

4. The sandwich panel according to claim 3, wherein the at least one curve section is a single curved section formed by the inner and outer skin, and the through-reinforcement includes first and second opposing ends that are each surrounded by the single curve section such that the through-reinforcement is situated in the curved section.

5. The sandwich panel according to claim 4, wherein the through-reinforcement is made perpendicular to the curve of the panel.

6. The sandwich panel according to claim 4, wherein the through-reinforcement is made substantially in the middle of the curved section.

7. The composite sandwich panel according to claim 1, wherein the web is a cellular web.

8. The composite sandwich panel according to claim 7, wherein the panel is an acoustic panel.

9. The composite sandwich panel according to claim 1, wherein the web comprises a foam.

10. An element for an aircraft, comprising a composite sandwich panel according to claim 1.

11. The composite sandwich of claim 1, wherein the plurality of fibrous plies of the outer skin includes an upper plurality of outer plies and a lower plurality of outer plies, the lower plurality of outer plies including the plurality of first plies and the plurality of second plies of the through-reinforcement.

12. The composite sandwich of claim 11, wherein the plurality of fibrous plies of the inner skin includes an upper plurality of inner plies and a lower plurality of inner plies, the upper plurality of inner plies including the plurality of first plies and the plurality of second plies of the through-reinforcement.

* * * * *